(12) United States Patent
Mullin

(10) Patent No.: US 8,856,116 B2
(45) Date of Patent: Oct. 7, 2014

(54) METHOD AND APPARATUS FOR INFORMATION EXCHANGE

(75) Inventor: Terence J. Mullin, Tustin, CA (US)

(73) Assignee: Viridistor LLC, Tustin, CA (US)

( * ) Notice: Subject to any disclaimer, the term of this patent is extended or adjusted under 35 U.S.C. 154(b) by 0 days.

(21) Appl. No.: 13/181,435

(22) Filed: Jul. 12, 2011

(65) Prior Publication Data

US 2011/0270801 A1 Nov. 3, 2011

Related U.S. Application Data

(63) Continuation of application No. 11/525,779, filed on Sep. 22, 2006, now Pat. No. 7,979,430.

(60) Provisional application No. 60/719,636, filed on Sep. 22, 2005.

(51) Int. Cl.
| | | |
|---|---|---|
| G06F 17/30 | (2006.01) | |
| G06F 3/06 | (2006.01) | |
| G06F 9/44 | (2006.01) | |
| G06F 21/62 | (2013.01) | |

(52) U.S. Cl.
CPC .............. *G06F 3/065* (2013.01); *G06F 3/0679* (2013.01); *G06F 9/4413* (2013.01); *G06F 21/6245* (2013.01); *G06F 3/0605* (2013.01); G06F 2221/2153 (2013.01); *G06F 9/4411* (2013.01); *Y10S 707/944* (2013.01)
USPC ............ 707/733; 707/621; 707/824; 707/944

(58) Field of Classification Search
CPC ... G06F 17/30017; G06F 21/10; G06F 21/57; G06F 17/30035; G06F 21/123; G06F 21/606; G06F 17/30867

USPC .................................. 707/733, 621, 824, 944
See application file for complete search history.

(56) References Cited

U.S. PATENT DOCUMENTS

| | | | |
|---|---|---|---|
| 5,822,500 A * | 10/1998 | Utsunomiya et al. .......... | 358/1.1 |
| 5,936,542 A | 8/1999 | Kleinrock et al. | |
| 6,704,733 B2 | 3/2004 | Clark et al. | |
| 7,103,592 B2 | 9/2006 | Huret | |
| 7,212,983 B2 | 5/2007 | Redmann et al. | |
| 7,257,581 B1 | 8/2007 | Steele et al. | |
| 7,333,977 B2 | 2/2008 | Swaminathan et al. | |
| 7,668,885 B2 | 2/2010 | Wittke et al. | |
| 7,774,384 B2 | 8/2010 | Kortum et al. | |
| 7,822,866 B2 | 10/2010 | Doumuki | |
| 7,827,175 B2 | 11/2010 | Plow et al. | |
| 7,979,430 B2 | 7/2011 | Mullin | |
| 2002/0068991 A1 | 6/2002 | Fitzsimmons, Jr. | |
| 2002/0107027 A1 | 8/2002 | O'Neil | |
| 2002/0165630 A1 | 11/2002 | Arthur et al. | |
| 2003/0105718 A1 | 6/2003 | Hurtado et al. | |
| 2003/0163622 A1* | 8/2003 | Moran ............................ | 710/74 |

(Continued)

*Primary Examiner* — Robert Beausoliel, Jr.
*Assistant Examiner* — Alexandria Bromell
(74) *Attorney, Agent, or Firm* — Klein, O'Neill & Singh, LLP

(57) ABSTRACT

A method and apparatus includes a portable electronic memory storage device and a plurality of exhibitor computers, each having at least one specifically identified electronic uploadable file and a port adapted to selectively interface with the portable device. When a portable device engages a port, electronic content corresponding to the port is uploaded from the computer to the portable device. In another embodiment, data from the portable device, such as demographic data, is also downloaded to the exhibitor computer.

14 Claims, 11 Drawing Sheets

(56) References Cited

U.S. PATENT DOCUMENTS

| | | |
|---|---|---|
| 2003/0194833 A1* | 10/2003 | Quinones et al. ............. 438/108 |
| 2003/0195833 A1* | 10/2003 | Baranowski .................... 705/37 |
| 2004/0117294 A1* | 6/2004 | Ferraro et al. .................. 705/37 |
| 2004/0199631 A1 | 10/2004 | Natsume et al. |
| 2004/0224703 A1 | 11/2004 | Takaki et al. |
| 2005/0197859 A1 | 9/2005 | Wilson et al. |
| 2006/0078859 A1 | 4/2006 | Mullin |
| 2006/0173752 A1* | 8/2006 | Bowlus et al. .................. 705/27 |
| 2006/0224995 A1* | 10/2006 | Treibach-Heck et al. ..... 715/816 |
| 2006/0294235 A1 | 12/2006 | Joseph |
| 2007/0106754 A1 | 5/2007 | Moore |
| 2007/0188323 A1* | 8/2007 | Sinclair et al. ............. 340/568.1 |
| 2008/0141381 A1 | 6/2008 | Walkoe et al. |
| 2008/0148056 A1 | 6/2008 | Ginter et al. |
| 2008/0312946 A1* | 12/2008 | Valentine et al. .................. 705/1 |
| 2009/0292768 A1* | 11/2009 | Franke .......................... 709/203 |
| 2011/0059772 A1* | 3/2011 | Want et al. .................... 455/557 |

\* cited by examiner

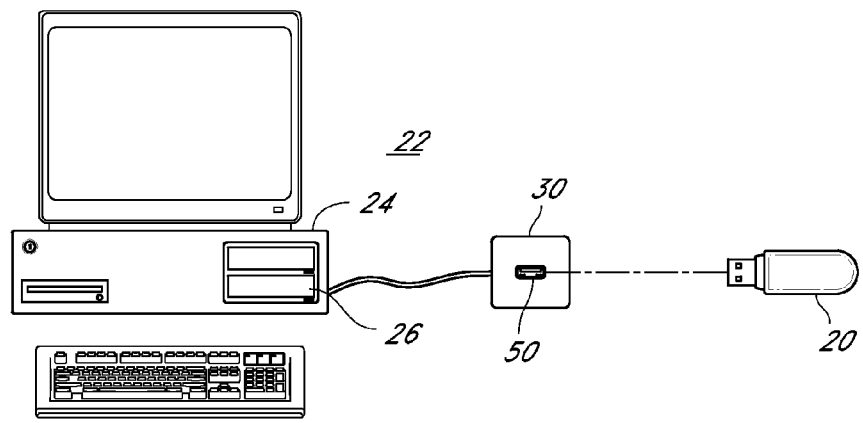
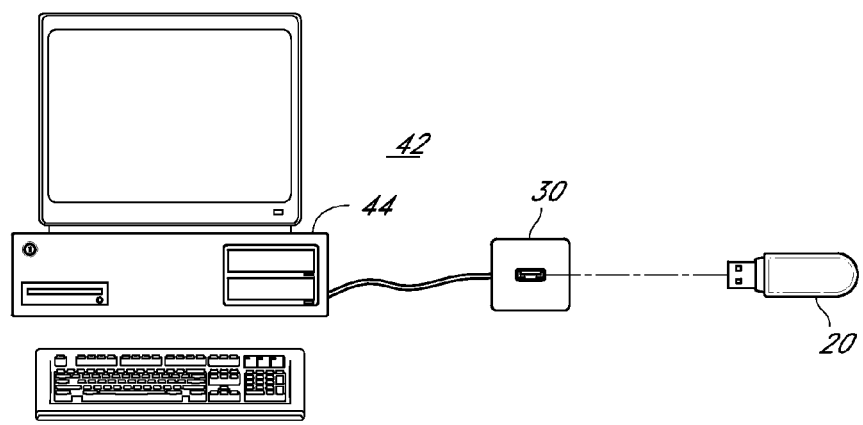
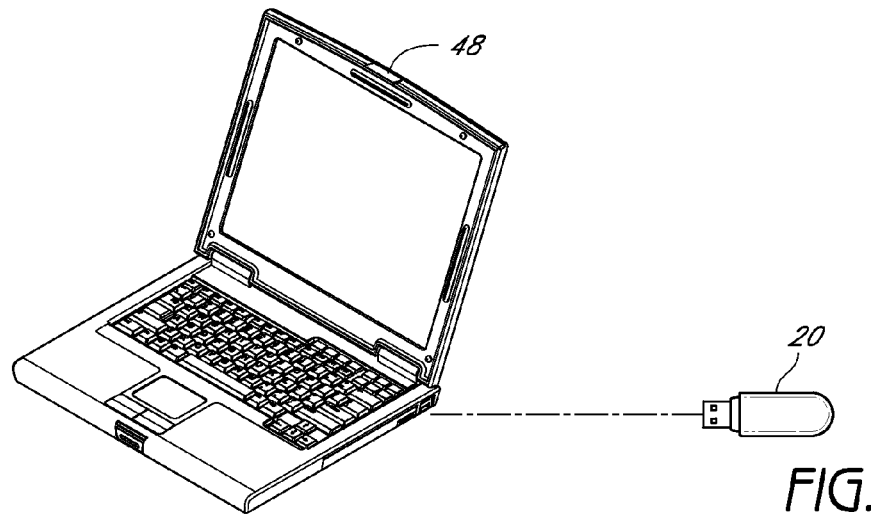
FIG. 1

METHOD AND APPARATUS FOR INFORMATION EXCHANGE

CROSS-REFERENCE TO RELATED APPLICATIONS

This application is a continuation of U.S. patent application Ser. No. 11/525,779, which was filed Sep. 22, 2006, which application was based on and claimed the benefit of U.S. Provisional Application No. 60/719,636, which was filed Sep. 22, 2005. The entirety of each of the priority applications is hereby incorporated by reference.

BACKGROUND OF THE INVENTION

1. Field of the Invention

The present invention relates to a method and apparatus for exchanging information. More particularly, the present invention relates to using a portable memory device to supply certain user information to a computer and in return obtain certain desired documentation from the computer.

2. Description of the Related Art

Exhibitions, such as trade shows, are held regularly in many industries in order to provide exhibitors an opportunity to demonstrate their wares to potential purchasers. Exhibitors typically occupy a demonstration booth or the like from which they may present their products and/or services. Traditionally, exhibitors offer printed product literature and/or electronic hardware such as CDs and DVDs having product information for interested parties to take in order to learn more about the exhibitor's products or services. Interested parties may also be directed to the exhibitors' websites. Such exhibitors prefer to obtain demographic information about those interested in their products so that follow-up contact can be made after the exhibition is concluded. Such contact information typically is given in the form of a business card, but other methods, such as written sign-in sheets, are also employed. Sometimes trade show attendees wear a badge encoded with demographic information that can be scanned by the exhibitor.

The existing models for exchanging such information are inherently inefficient and have limited effectiveness. For example, often interested parties will take product literature, but will not provide contact information; thus, the exhibitor cannot follow-up with the interested party. Also, it can be inconvenient and time-consuming to exchange information, and some parties may decide not to endure the hassle. Thus, a potential business contact is not made. Additionally, product literature tends to be expensive to produce and to transport to and from the exhibition.

Exhibition attendees also face challenges with traditional literature collection. For example, an exhibition attendee who is interested in many different products can quickly accumulate several pounds of paper literature and electronic hardware, which the attendee must lug around the exhibition and eventually transport home. Further, such accumulation of paper literature and other media tends to get jumbled up and disorganized. Thus, the attendee likely loses track of certain literature that was obtained during the exhibition.

SUMMARY OF THE INVENTION

Accordingly, there is a need in the art for an effective and efficient system and method for exchanging contact information of interested parties and product information of exhibitors in a time efficient, inexpensive, and organized manner.

In accordance with one embodiment, the present invention provides a system for information exchange. The system comprises a computer having an interface port adapted to selectively communicate with a portable electronic memory storage device, a designated electronic file saved on the computer, and software running on the computer. The software is adapted to be triggered when a portable electronic storage device is engaged with the interface port and, upon triggering, to automatically initiate a data exchange routine with the engaged portable electronic storage device. The data exchange routine comprises identifying a user data stored on the portable device, downloading the user data to the computer, uploading the designated file to the portable device, and saving a tag with the downloaded user data on the computer. The tag indicates that the designated file was uploaded to the portable device corresponding to the downloaded user data.

In one embodiment, the software is configured to ignore data files on the portable device other than the user data. In another embodiment, the software is configured to not proceed with the data exchange routine unless and until detecting a user data authorization code on the portable device.

Yet another embodiment additionally comprises a second designated electronic file saved on the computer and a second interface port adapted to communicate with the computer when a portable electronic storage device is engaged with the second port. The software is adapted to upload the second file to the portable device when the portable device is connected to the second port, download user data to the computer, and tag the downloaded user data to indicate that the second file was uploaded to the portable device corresponding to the downloaded user data. In still another embodiment, the computer comprises a computing network adapted to monitor a plurality of interface ports, upload electronic files designated for respective ports, download a user data in connection with each file upload, and tag each downloaded user data with an indication of the file uploaded to the portable device associated with the user data.

In accordance with another embodiment, the present invention provides a method for electronically exchanging information. The method includes providing a portable electronic storage device having user data stored thereon, providing a computing system comprising a processor and an electronic storage portion, and providing an interface communicating with the computing system. The user data comprises demographic data about a user. A designated data file is stored on the electronic storage portion. The interface is adapted so that the portable storage device can selectively engage the interface so as to communicate with the computing system via the interface. The method further includes engaging the portable electronic storage device with the interface, communicating an electronic copy of at least part of the user data from the portable device to the computing system storage portion and saving the user data therein, and communicating an electronic copy of the designated data file from the computing system electronic storage portion to the portable device and saving the designated data file therein. A single action by a user triggers automatic execution of the steps of communicating the user data and communicating the vendor data.

In one embodiment, the single triggering action comprises engaging the portable electronic storage device with the interface. In another embodiment, an actuator communicates with the interface so as to selectively activate the interface, and the single triggering action comprises actuating the actuator. In a further embodiment, the actuator comprises a button.

Yet another embodiment comprises providing a completion signal when the steps of communicating the user data and communicating the vendor data are complete. In a further embodiment, providing the completion signal comprises illuminating a lamp at or adjacent the interface. A yet further embodiment additionally comprises providing a processing signal when the steps of communicating the user data and communicating the vendor data are in process. In still a further embodiment, providing the processing signal comprises illuminating a first lamp at or adjacent the interface, and providing the completion signal comprises illuminating a second lamp at or adjacent the interface.

In a further embodiment, the user data comprises a plurality of data classes, and the embodiment additionally comprises providing a vendor authorization on the computing system. The vendor authorization is adapted to grant access to selected ones of the plurality of user data classes. Saving user data on the computing system storage portion comprises saving only user data in user data classes to which the vendor authorization grants access.

In accordance with a still further embodiment, a method of electronically delivering specialized content is provided, comprising electronically monitoring an interface port adapted to communicate with a computer when a portable electronic storage device is engaged with the port, identifying a designated electronic file saved on the computer, actuating a trigger upon determining that a portable device is engaged with the port, and initiating a data exchange routine when the trigger is actuated. The data exchange routine comprises uploading the designated electronic file to the portable electronic storage device.

In another embodiment, the data exchange routine additionally comprises identifying a user data file on the portable device, accessing the user data file, and downloading data from the user data file to the computer. In a yet further embodiment, the user data file comprises demographic information about a user of the portable device. In still a further embodiment, the data exchange routine additionally comprises identifying an electronic code associated with the user data file, determining whether the code is acceptable, and proceeding with the data exchange if the code is acceptable.

In still another embodiment, the user data file is encrypted, and the method additionally comprises decrypting and accessing the user data file. Another embodiment comprises identifying a user data authorization level, accessing the user data file, and downloading only a portion of the user data file corresponding to the user data authorization level.

A yet further embodiment comprises monitoring a second interface port adapted to communicate with the computer when a portable electronic storage device is engaged with the port, identifying a second designated electronic file saved on the computer, actuating a second trigger upon determining that a portable device is engaged with the port, and initiating a second data exchange routine when the second trigger is actuated. The second data exchange routine comprises uploading the second designated electronic file to the portable electronic storage device engaged in the second port.

In a still further embodiment, an actuator is configured to selectively control whether the interface port communicates with the computer, and the step of electronically monitoring the interface port is performed only when the actuator is at an on setting.

BRIEF DESCRIPTION OF THE DRAWINGS

FIG. 1 is a schematic illustration of a system and method in accordance with one embodiment.

DETAILED DESCRIPTION OF PREFERRED EMBODIMENTS

Figure 2:
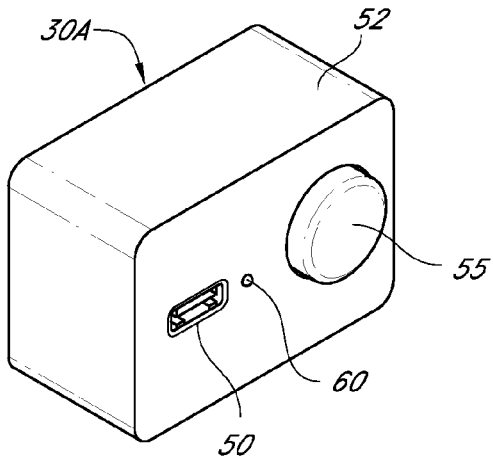
FIG. 2 illustrates an embodiment of an interface device.

With initial reference to FIG. 1, an embodiment of a system and method for exchanging information is presented. In order to aid presentation, the illustrated embodiment will be discussed in the context of a trade show in which an attendee, or user, is given a portable electronic memory storage device 20 for uploading electronic information from exhibitors, such as vendors. In one embodiment, the portable electronic memory storage device comprises a USB-based memory device such as a "flash memory" drive or "thumb drive." Of course, it is to be understood that other types of portable electronic memory devices can be employed. For example, acceptable portable memory devices may include, without limitation, small card-based memory such as "compact flash" memory cards or "memory sheets," hand-held computers, such as personal digital assistants (PDAs), laptop and/or notepad computers, and other small portable electronic devices that have an electronic memory, such as an Apple® iPod® or other devices that can store digital files in data, audio, video, or other formats.

Preferably, the user's device comprises an electronic file having certain demographic data concerning the user. Most preferably, such demographic data includes at least the user's name and contact information.

In the context of a trade show, exhibitors generally have demonstration booths, kiosks, or the like at which they present information about their products. In the embodiment illustrated in FIG. 1, a first vendor booth 22 has a computer 24 set up at or adjacent their booth. The first vendor computer 24 preferably includes an electronic storage unit 26, such as a disk drive, and an interface device 30, such as a USB port, that is in electronic communication with the electronic storage unit 26. Similarly, a second vendor booth 42 preferably has a computer 44 that includes an electronic storage unit 26 and an interface device 30. Each electronic storage unit 26 preferably includes one or more electronic files of product information such as product specifications, brochures, and/or sales literature concerning products displayed and/or demonstrated at the exhibitor's booth.

As used in this specification, the term "computer" is a broad term used in accordance with its usual meaning and including a broad range of computing devices such as, for example, desktop, laptop, and handheld personal computers; computer networks; network servers; kiosks or other devices having electronic processing capability, and the like.

If, for example, an attendee is interested in a product being demonstrated by the first vendor, the attendee engages his portable memory device 20 with the interface 30, at which time the attendee's demographic data is downloaded from the portable device 20 onto the first vendor's electronic storage unit 26, and then the first vendor's product information files are uploaded from the storage unit to the attendee's portable device 20. Once transfer is complete, the attendee removes the device 20 from the interface 30 and can continue browsing various booths of the exhibition. Upon finding another interesting product at the second vendor's booth 42, the user engages his portable memory device 20 with the second vendor's interface 30-2, thus providing demographic information to the second vendor and obtaining desired product information from the second vendor.

It is anticipated that each attendee will interface with multiple, even several, exhibitors during the course of a day or other specified time at the trade show. At the end of the show, or as desired, the attendee preferably engages the portable memory device 20 with the attendee's own computer 48, such as a laptop computer. The contents of the portable memory device 20, and specifically the product information downloaded from the vendors, is thus available to the attendee in electronic form and can be downloaded onto the attendee's computer 48 or maintained on the portable device 20 as desired by the attendee. Similarly, since each vendor from which the attendee obtained product information also received demographic information about the attendee, preferably including identification of which product information the user obtained from that vendor, the vendor can later contact the attendee to follow-up, answer further questions, and perhaps enter into a business relationship.

In the embodiment illustrated in FIG. 1, the interface devices 30 have been depicted schematically, each including a port 50 adapted to engage the user's portable memory storage device 20. With reference next to FIG. 2, in one embodiment, the interface device 30A is a separately-formed device having a port 50 and a housing 52. In the embodiment illustrated in FIG. 2, an actuator 55 is provided to trigger communication between a portable memory device 20 engaged in the port 50 and the computer 24 attached to the interface 30. In one embodiment, preferably the port 50 is deactivated until the actuator button 55 is depressed. As such, the computer 24 cannot detect the attendee's device 20 engaged in the port 50 until the button 55 is actuated.

Preferably, an indicator 60 is also provided for informing a user when the interface 30A is available for use and when data transfer is complete. In one preferred embodiment, the indicator 60 comprises two different-colored lamps, such as red and green LED lamps. The green LED lamp is illuminated when the associated port 50 is available for use. When the attendee device 20 is engaged in the port 50, and the attendee actuates the "Go" button 55, data transfer between the port 50 and the computer 24 begins, and the red lamp is illuminated so as to indicate that the system is busy and that the portable memory device 20 should not be removed from the port 50. When data transfer is complete, the green lamp is again illuminated, indicating that the transfer is complete and the portable device 20 may safely be removed from the port 50. In one embodiment, when data exchange is complete, the green lamp flashes in order to prompt the attendee to remove the device.

Figure 3:
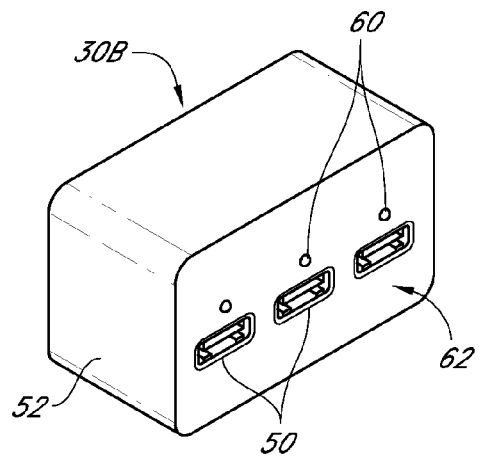
FIG. 3 illustrates another embodiment of an interface device.

With reference next to FIG. 3, an interface device 30B is illustrated comprising a hub 62 having multiple ports 50. In the illustrated embodiment, the hub 62 comprises a USB hub having a plurality of USB ports adapted to electronically interface with the computer using commercially-available software such as the software that comes pre-installed with the USB hub 62. It is to be understood that other types of interfaces, both wired and wireless, can appropriately be employed. Preferably, the interface device 30B comprises a housing 52. Also, preferably an indicator 60 is provided for each port 50. It is to be understood, however, that a multi-port USB hub as purchased off-the-shelf, and having no separate housing, may also be suitably employed. In one embodiment, the interface ports can be incorporated as part of an associated desktop computer, and the indicator may comprise the computer screen, which is configured to provide a status message and prompt.

In the interface device 30B of FIG. 3, no separate actuator is provided. Instead, when an attendee portable memory 20 device is engaged in a port 50, the associated computer detects the presence of the attendee's device and begins information transfer. As such, an attendee's act of engaging his portable memory device 20 with a port 50 triggers data transfer.

Figure 4:
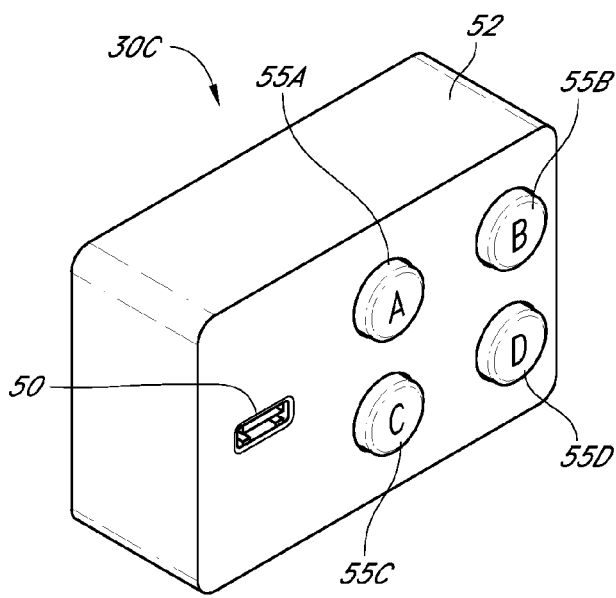
FIG. 4 illustrates yet another embodiment of an interface device.

With reference next to FIG. 4, another embodiment of an interface device 30C is provided in which attendee chooses which product information is uploaded to his memory device 20. A plurality of actuators 55A-D are provided, each actuator corresponding to a different product or group of products. The user engages his memory device 20 with a port 50 and actuates a desired actuator 55A-D in order to trigger data exchange to receive the electronic files associated with the chosen product. For example, in the illustrated embodiment, once the user's memory device is engaged in the port 50, the user may choose to upload product information regarding one or more of products A, B, C and D.

Figure 5:
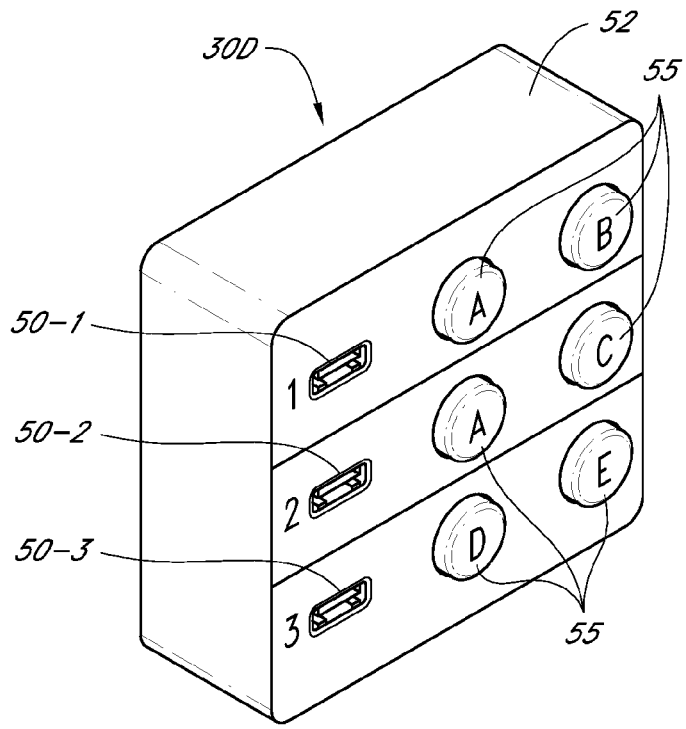
FIG. 5 illustrates still another embodiment of an interface device.

With reference next to FIG. 5, yet another embodiment of an interface device 30D is provided. The device 30D includes a plurality of ports 50-1, 50-2, 50-3, each of which can provide electronic information concerning one or more products. However, certain ports may be tied to certain product choices. For example, in the embodiment illustrated in FIG. 5, information on product A can be obtained from both ports 50-1 and 50-2. However, information on product C is only available from port 50-2 and information on products D or E is only available from port 50-3.

Figure 6:
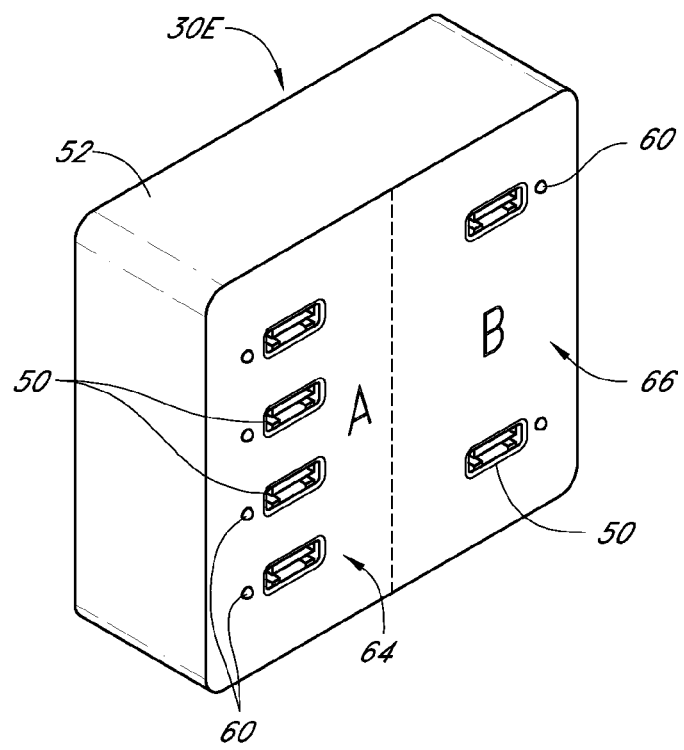
FIG. 6 illustrates a still further embodiment of an interface device.

With reference next to FIG. 6, another embodiment of an interface device 30E is provided in which specific ports 50 are configured to exchange information on a corresponding product or family of products. However, in the illustrated embodiment the attendee need not separately actuate any device in order to download the product information associated with the port. For example, engaging a portable device 20 with any one of a first group 64 of ports 50 will automatically trigger exchange of electronic information regarding product A while any one of the second group 66 of ports 50 will trigger uploading of electronic files concerning product B.

In the embodiments illustrated in FIGS. 2-6, one or more ports 50 have been illustrated and disposed on a single interface device 30, and in some embodiments, physical buttons have been illustrated as actuators. It is to be understood, however, that various structural configurations, with or without housings, may be employed for interface devices. For example, an interface device may be physically incorporated into a kiosk or the like that also includes or is linked to the associated exhibitor's computer. Additionally, actuators may include physical buttons as shown, but can also include other types of structures such as, for example, a touch screen graphical interface, audible instruction interface, or any other way of obtaining the attendee's instructions.

Figure 7:
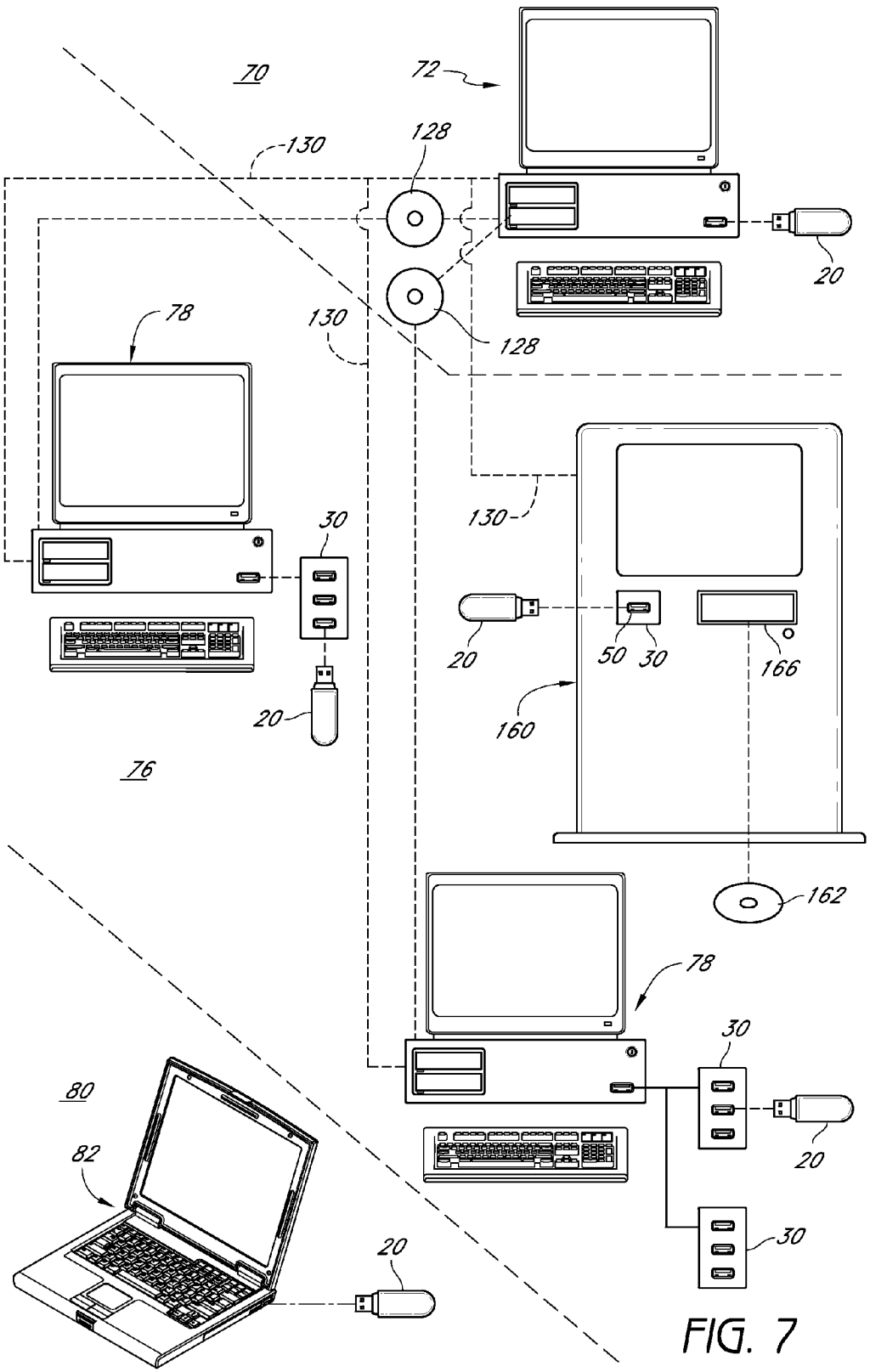
FIG. 7 is a schematic representation of different phases and components of a system and method in accordance with an embodiment.

With reference next to FIG. 7, in accordance with one embodiment, a plurality of computing environments are employed. As shown, an administrative environment 70 includes an administrative computer system 72, an exhibition environment 76 includes a plurality of exhibitor computers 78, and an attendee environment 80 includes an attendee computer 82. Notably, a portable electronic memory storage device 20 can be used in each computing environment.

The administrator environment 70 preferably comprises an administrator computing system 72 for initializing each attendee's portable memory storage device 20, and for specifically configuring software to be installed on each exhibitor's computer 78 so that data transfer is controlled and organized in an efficient manner.

Figure 8:
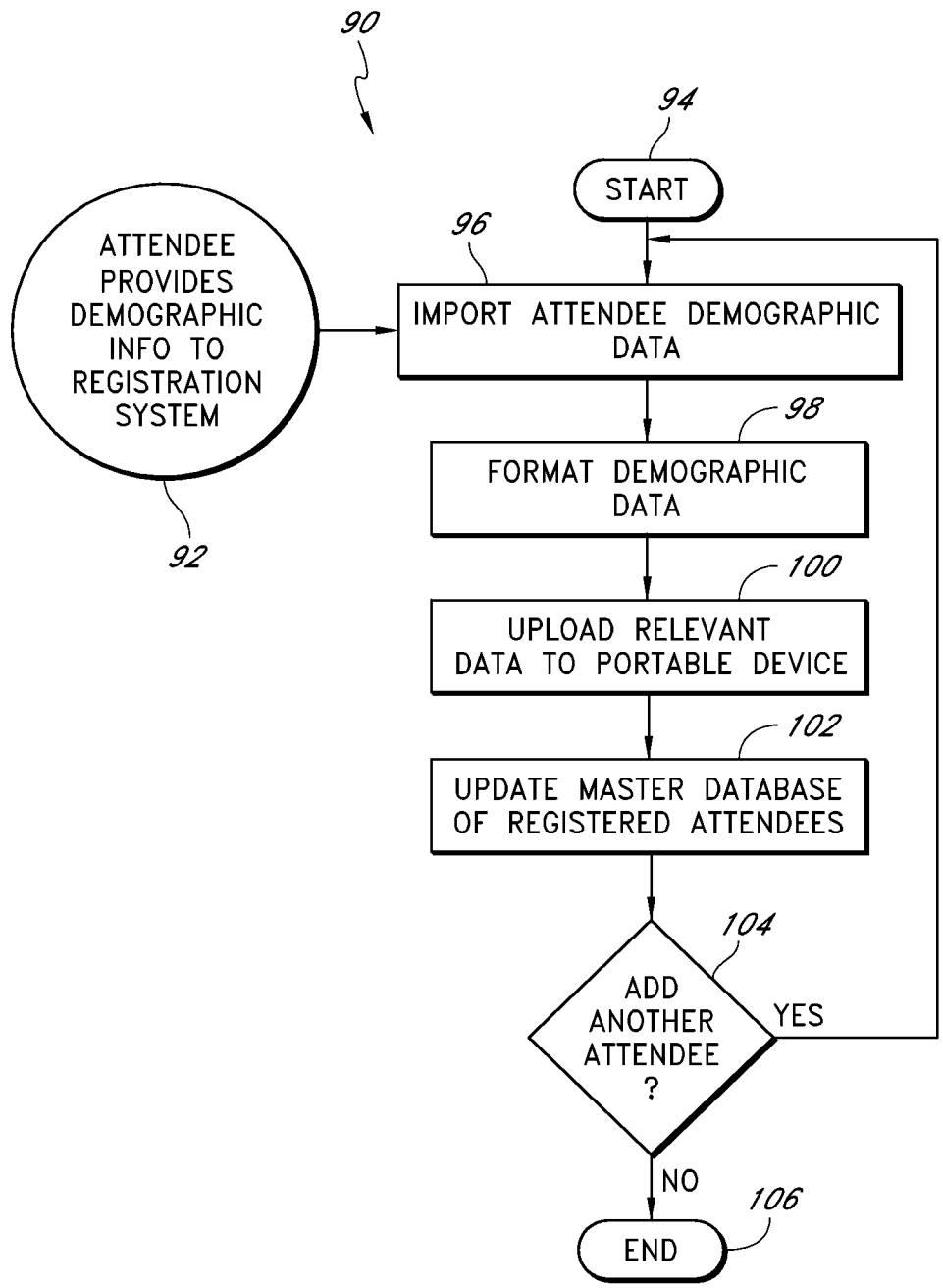
FIG. 8 is a flow chart depicting an embodiment of initializing a portable memory device.

With reference also to FIG. 8, a routine 90 is depicted for the administrative computing system 72 to initialize portable memory storage devices 20 to be used in an exhibition. Such initializing prepares and customizes the device for the particular exhibition and attendee.

As indicated in box 92, when an attendee registers for the exhibition, the attendee preferably provides certain demographic information to the exhibition administrator. Such demographic information typically includes the attendee's name, address, business name, position, contact information such as mailing address and e-mail, industry responsibilities, interests, purchase needs, other special needs that may meet the overall theme of the exhibition. In one embodiment, the attendee completes a questionnaire that obtains extensive demographic information that would be helpful for exhibitors. Preferably, such demographic information is loaded into an electronic format either by the attendee himself or by an administrative staff processing the attendee's registration materials. In another embodiment, the attendee registers online and provides demographic information on an online form using commercially-available software.

With continued reference to FIG. 8, upon start 94 of the routine 90 for initializing a registered attendee's portable memory device 20, preferably attendee demographic information in an electronic format is imported into the administrative system 96. In another embodiment, such demographic data may already be on the administrative system. Preferably, the demographic information is next configured 98 into a generalized format that allows easy manipulation of the formatted information. For example, data may be arranged in a comma separated value (CSV) format that is readily usable by most information management programs. Preferably, specific demographic data is placed in a particular order so that the position of the data in the CSV format identifies the type of data it is, such as address, name, etc. In other embodiments, specific demographic fields can be individually coded and saved in another format. In a preferred embodiment, the administrative computer and/or network preferably formats the attendee demographic information as desired so as to prepare one or more files of such demographic information to be uploaded to the corresponding attendee's portable memory device.

As indicated in step 100, formatted demographic data preferably is uploaded to the attendee's portable device 20 and saved in one or more electronic files as desired. Preferably, the demographic files are encrypted so that if the portable device is misplaced or stolen, the attendee's demographic information remains protected. In another embodiment, one or more additional electronic files are uploaded to the portable device. One such additional file may include information on the exhibition such as an exhibition guide, an advertisement, and/or HTML links to the exhibition's website. Software may also be uploaded to help the attendee organize and browse exhibitor information that will eventually be uploaded to the device. Further, during registration, the attendee may have indicated a desire to have particular information uploaded to his device in advance (i.e., information regarding company A and/or product B). Such information may thus be uploaded during this initialization routine.

With continued reference to FIG. 8, once the data has been uploaded to the portable device, a master database of registered attendees is updated 102 with the attendee's appropriately-formatted demographic data. The administrative computer preferably is then prompted 104 whether to add another attendee. If more devices are to be initialized, the process begins again; if not, the process terminates 106.

Once the portable device 20 is initialized, it can be mailed, delivered or otherwise provided to the attendee. Preferably, the device is marked with graphics advertising the exhibition and/or including advertisements for exhibitors.

As discussed above, preferably the attendee provides demographic information. In one embodiment, in order to register for the exhibition, the attendee must supply certain basic information, such as name and address. Other information such as business name, position, interests, more detailed contact information, a detailed demographics questionnaire and the like may be optional. Additionally, in some embodiments, there may be incentives for the attendee to provide such additional information. Such incentives may include a reduction or elimination of registration fees, a special gift, VIP treatment, or the like.

Additionally, the registration form may include a privacy policy in which the administrative organization commits to treat all or part of the registrant's demographic information in accordance with the policy. In a further embodiment, the attendee may be prompted to authorize disclosure of certain demographic information only to exhibitors who have committed to adhere to conditions, such as adhering to the exhibition administrator's privacy policy.

In another embodiment, multiple levels of demographic data are identified. For example, a basic level includes basic information such as attendee name and address. An enhanced level of information further includes the attendee's business name, position, and more thorough contact information. An advanced level of demographic information additionally includes, for example, attendee's current product ownership/use, interests, anticipated time window for a purchase, technology/product needs, and other information including demographic information about the attendee obtained from a detailed questionnaire.

During data formatting 98, the multiple levels of demographic information preferably are formatted to identify the different levels. In one embodiment, multiple levels may be stored in a single file in a CSV format with the data values organized in a specific order so that the information can be tracked and organized. In another embodiment, the multiple levels of demographic data are stored in a CSV format, but each data level begins on a new line. In still another embodiment, basic demographic information is saved in a first file;

enhanced demographic information is saved in a second file; and advanced demographic information is saved in a third file.

In accordance with another embodiment, the administrative computing environment 70 may include a registration station including a kiosk, computer, network or other computing device at which an attendee can register at the time of arriving at the exhibition. The attendee preferably completes the demographics questionnaire electronically, and the information is electronically entered into the administrative computer, appropriately formatted, and uploaded to a portable memory device for the attendee.

For attendees who wish to pick up their portable memory device at the exhibition, preferably a computer is available so that an exhibitor staff member can initialize a portable device for the attendee on the spot. In still another embodiment, the present system enables an attendee who has lost, damaged or corrupted his portable memory device to access the administrative computer system and either get the device re-initialized with his information or get another portable memory device initialized for the attendee. In still another embodiment, an attendee can request more than one portable device.

Figure 9:
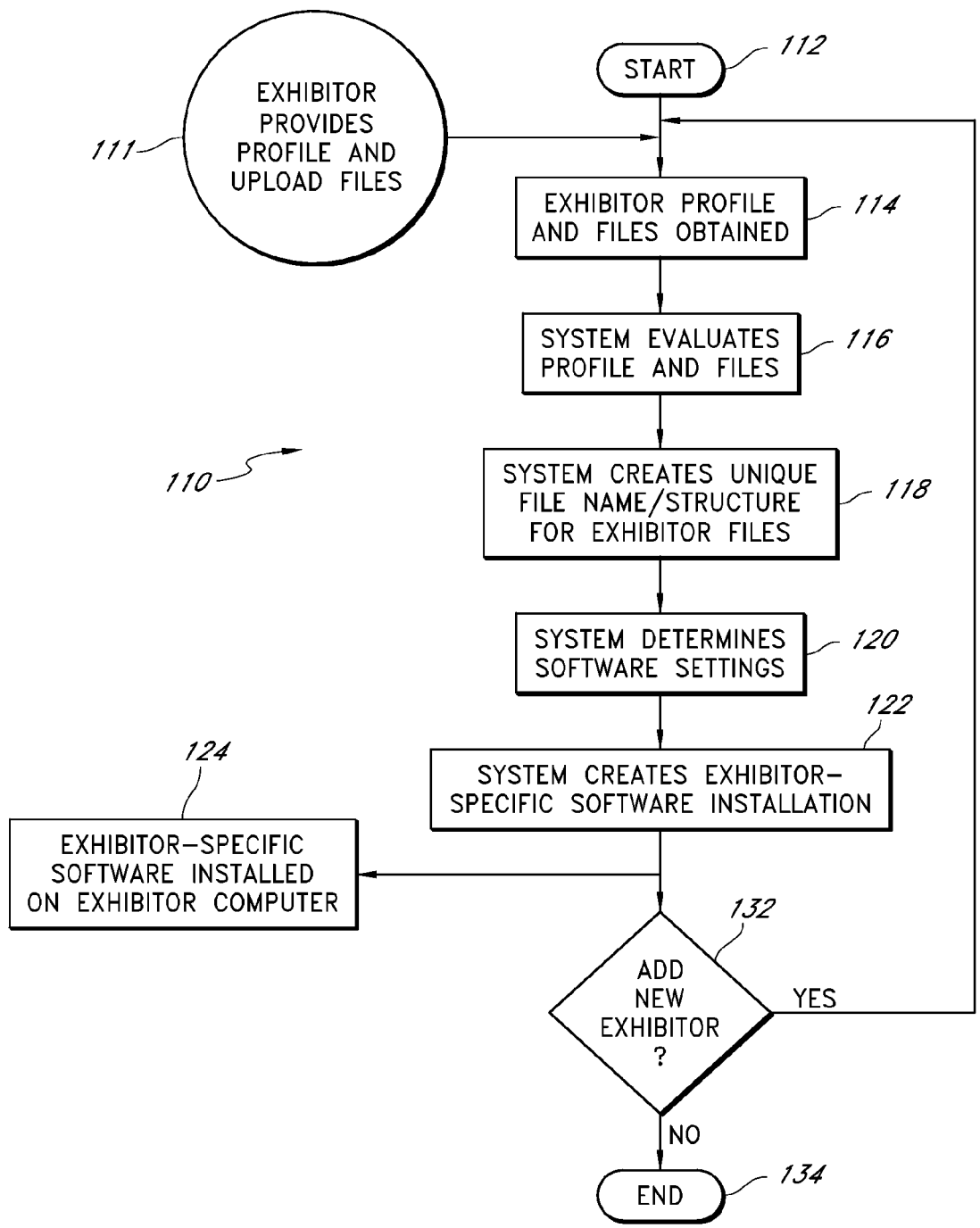
FIG. 9 is a flow chart depicting an embodiment of defining an exhibitor software setting for initializing an exhibitor computer.

With specific reference next to FIGS. 7 and 9, prior to or during the exhibition, an exhibitor's computing device preferably is set up to run data transfer software controlled by the administrator. Such software is adapted to standardize and regulate exhibitor interaction with attendee portable electronic memory devices 20. For example, the transfer software preferably enforces limits to the size and configuration of electronic content uploaded by the exhibitor to an attendee. Further, the software preferably regulates access by exhibitors to attendee demographic information. Also, the software preferably provides security to prevent exhibitors from interfering with other exhibitor information that may have been uploaded by previous exhibitors, or interfering with the portable device's ability to upload additional information after interacting with the exhibitor.

FIG. 9 illustrates an embodiment of a routine 110 in which the administrative system 72 sets up customized data transfer software for each exhibitor. In the illustrated embodiment, the exhibitor preferably provides 111 a copy of the electronic content that it wishes to provide to attendees. The exhibitor also provides 111 a profile including information such as exhibitor name, product(s), booth location, responsible/contact person, and the like. The exhibitor profile preferably also includes the exhibitor's status in relation to certain conditions set by the administrator. For example, in one embodiment, the profile indicates whether the exhibitor has committed to abide by the administrator's privacy policy in its treatment of attendee demographic information. In some embodiments, the exhibitor may apply to qualify for a desired level of attendee demographic data. For example, if the exhibitor commits to abide by the privacy policy, the exhibitor may qualify for the basic level of attendee demographic information; for an additional fee, the exhibitor may qualify for enhanced attendee demographic information; and for a further fee and/or a commitment to or history of repeat attendance at the exhibition, the exhibitor may qualify for the advanced level of attendee demographic information.

Upon the start 112 of the routine 110 for setting up transfer software for each exhibitor, the routine identifies and obtains 114 the information provided by the exhibitor. Once the exhibitor profile has been established and electronically entered into the administrative system, and once the exhibitor's content is provided and identified, the administrative system analyzes 116 certain aspects of the content such as electronic file size, virus checking, and the like. The administrator determines the level of demographic data for which the exhibitor qualifies and determines whether the content submitted by the exhibitor fits within file size limits. The administrative system then assigns a unique file name 118 and/or folder structure to the exhibitor and/or the exhibitor content. By controlling and regulating the file names of the exhibitor content, the exhibition administrator avoids duplicate or similar file names and the like that could confuse attendees or disrupt information from interfacing smoothly during the exhibition.

In another embodiment, the administrator computer 72 adds a code or tag to each exhibitor upload file. Preferably, a corresponding code or tag is loaded onto the portable devices 20, and the transfer software is adapted so that unless appropriate codes are included, the exhibitor files will not be uploaded to the attendee devices. Thus, the administrator retains control over electronic files that are exchanged between exhibitors and attendees. In another embodiment, software routines are disposed on both the exhibitor computer and portable device, which routines identify security codes or tags on the files identified for transfer before allowing such file transfer.

In one embodiment, each exhibitor is allowed a limited electronic content volume for uploading to attendees' portable devices. As such, information size can be regulated so that attendee devices are not quickly filled to capacity during the exhibition. Instead, the attendee can obtain information from many different exhibitors yet stay within the limited memory volume of the portable device. In further embodiments, an exhibitor may qualify for additional electronic volume by satisfying certain conditions. For example, an exhibitor may pay an additional fee for the right to upload a larger volume of content. Additionally, if an exhibitor purchases multiple booths, the memory size limitations based on that exhibitor may be increased proportionately based on booth space or upon additional factors such as use of kiosks or the like. In further embodiments, a single exhibitor may choose to have two or more different files to upload depending on which products the attendee is interested in. Electronic file volume constraints may apply to all files collectively or each file individually, depending upon administrator preferences.

As indicated in box 120, the administrator system evaluates the exhibitor profile and exhibitor content and determines certain settings of the data transfer software, such as attendee demographic level qualification, content file size, identification of file(s) approved for upload, and file names. The administrator system 72 then configures 122 a specific software package for the exhibitor, which software incorporates the settings. The exhibitor-specific transfer software is then installed 124 on the exhibitor's computer 78. This may be done in any desired manner. For example, in one embodiment, the administrative system prepares and burns a CD, DVD 128 or other portable memory device that is given to the exhibitor for installation on the exhibitor's computer 78. In another embodiment, the administrator communicates with the exhibitor computer over a network connection 130 such as an intranet, extranet or the internet in order to download and install 124 the software on the exhibitor's computer.

With continued reference to FIG. 9, once an exhibit's transfer or software package has been set up and provided to the exhibitor, the administrator system prompts 132 whether another new exhibitor is to be added to the system. If yes, the process starts again; if no, the routine ends 134.

In an embodiment as discussed above, the administrator system creates a unique file name and/or structure for data storage for each exhibitor. As such, there is no overlap between exhibitor names and duplicates are avoided. In one embodiment, the administrator assigns the name without input from the exhibitor. In another embodiment, the exhibitor chooses a number of preferred names in order of priority when providing profile information to the administrator. In determining a unique name for the particular exhibitor, the administrator preferably gives priority and consideration to the prioritized preferred names given by the particular exhibitor.

Figure 10:
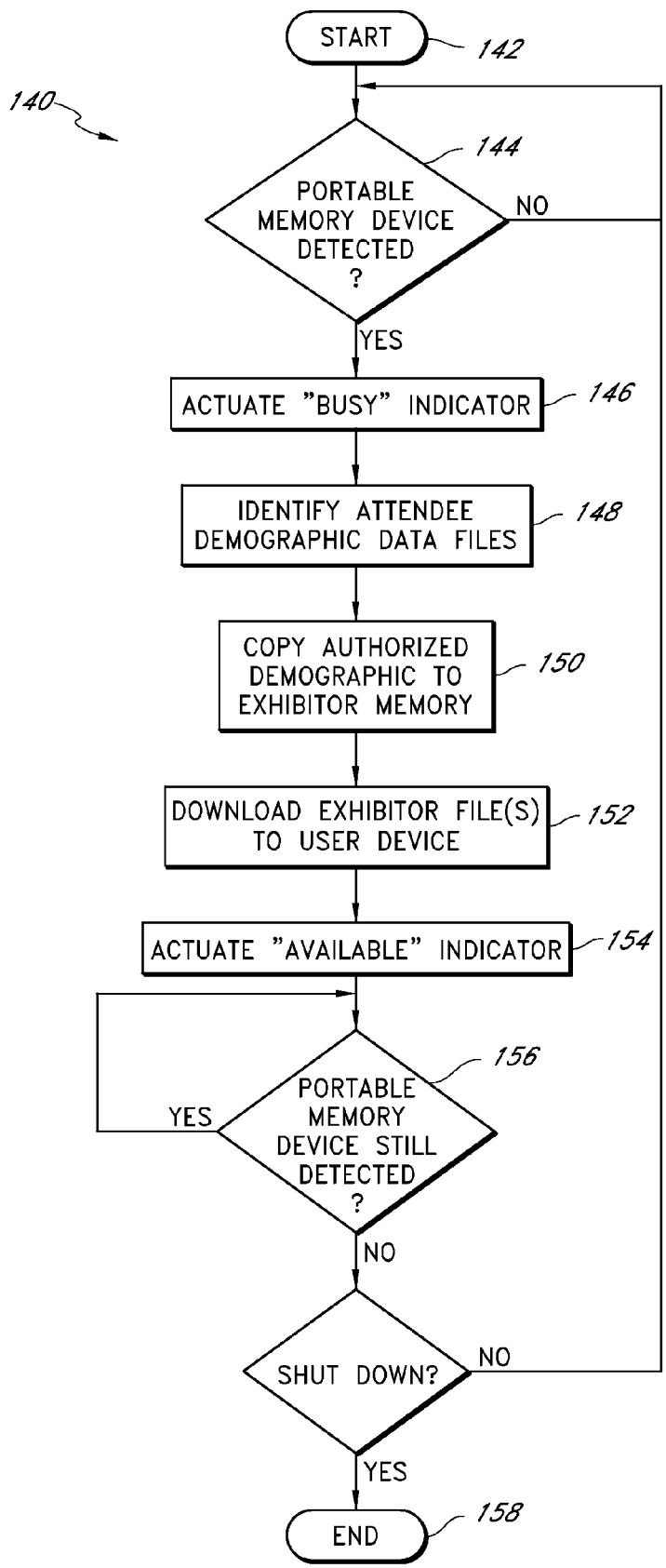
FIG. 10 is a flow chart depicting an embodiment of an interface of a portable memory device with an exhibitor computer.

With reference next to FIGS. 7 and 10, interface between exhibitor computers 78 and attendee portable memory devices 20 preferably takes place in the exhibition computing environment 76. As discussed above, during interface, information is exchanged between the exhibitor computer 78 and the attendee device 20. FIG. 10 is a flow chart illustrating an embodiment of the transfer software operating on the exhibitor computer to interface with an attendee device.

As indicated in box 144, upon start 142 of the routine 140, the software monitors each connected port 50 to determine whether an attendee portable memory device 20 has been engaged. Once engagement of an attendee device is detected, preferably an indicator 146 is actuated to indicate data transfer is proceeding and to prompt the attendee to not remove the portable device 20.

To begin the transfer, the software preferably first accesses the attendee device 20 to identify 148 the attendee demographic data files. The software preferably notes the authorized demographic level of the exhibitor, which is set in the software installation, and copies 150 only that demographic data which the exhibitor is authorized to obtain. Such copied demographic data is saved to the exhibitor's computer.

Next, the transfer software locates the exhibitor electronic content corresponding to the particular port and/or to any button that may have been actuated by the attendee. The appropriate exhibitor electronic content is then uploaded 152 to the attendee device and saved in accordance with the file name and/or file structure that was determined by the administrator system during exhibitor software setup. Preferably a code or other indicator of the particular product information obtained by the attendee is linked to the attendee demographic data on the exhibitor computer.

Once the information exchange is complete, another indicator 154 is actuated to indicate that the data transfer is complete and the attendee device 20 may be removed. The transfer software continues to monitor 156 the port 50 to see whether the memory device 20 has been removed. Once the device 20 has been removed from the port 50, the computer 78 returns to the beginning of the process unless the system has been prompted to shut down. Upon shutdown of the system, of course, the process ends 158.

The transfer software preferably is adapted to run in conjunction with existing operating systems and platforms. For example, the software preferably is adapted run with a Microsoft® Windows®-based operating system and/or an Apple®-based operating system. In some operating systems, when a device such as a USB-based device engaged with a port attached to a computer, the operating system detects the added device and prompts the computer user whether and how to deal with it. In a preferred embodiment, the transfer software disables the user prompt of the operating system, but allows the operating system to detect engagement of the portable memory device, and begins the data transfer upon such detection. In another embodiment, once the transfer software is installed and running on the exhibitor's computer, the software disables the external device monitoring function of the operating system, and the transfer software monitors the port instead.

As discussed above, preferably certain security measures are in place between the portable electronic memory device and the specially-configured transfer software to regulate and control data transfer between the attendee and the exhibitor. For example, preferably the attendee demographic data file or files are encrypted so as not to be accessible directly by any party. Preferably, the exhibitor software is adapted to open the encrypted file and save a copy of the file in an unencrypted format or, in another embodiment, to access the data within the files and save the data to which the exhibitor is authorized on the exhibitor computer in an easily usable format. Also, in one embodiment, before any file is copied or accessed, the transfer software checks the file for viruses and/or data in an unexpected format, and only proceeds with the transfer if the files are in order.

In further embodiments, security enhancements can include, for example, a code or tag that has been uploaded to the portable device indicating that the device is authorized and initialized for use at the exhibition. The exhibitor software, upon detecting engagement of the device with the interface, searches for this tag before proceeding with any data transfer. In one embodiment, such a tag is different for each attendee. Thus, if an attendee's device is lost or stolen, the attendee's tag may be deactivated. Additionally, in order to deter hacking or changing of the exhibitor software and/or files to be uploaded by the software to the attendee device, the exhibitor software preferably includes a code or other security mechanism that is triggered if changes are made to the software or file content after the software has been setup by the administrator. Triggering of the security measure preferably disables the transfer software until it is re-setup by the administrator.

In still another embodiment, during portable device initialization, a security feature is uploaded to the device 20 to deter the attendee from copying the uploaded data to another portable device. Such a security measure may include, for example, a hidden file that must be detected by the exhibitor software in order for the transfer to take place. Thus, a counterfeit personal memory device will not be able to trigger data transfer at the exhibition.

It is anticipated that some attendees will obtain so much information that they fill up their personal memory device 20 while only midway through the exhibition. Such attendees may wish to obtain additional information from exhibitors. With reference again to FIG. 7, in one embodiment, preferably one or a plurality of download kiosks 160 are provided on the exhibition floor. Attendees may engage such kiosks 160 with their personal memory devices, and the kiosk will download information from the device to a memory device 162. In one embodiment, the 166 memory device 162 is a CD or DVD to which the information is downloaded, and the kiosk 160 includes a disk drive 166 for burning such CDs or DVDs. In another embodiment, the information is downloaded to a dedicated, password-protected website that the attendee can later access over the internet.

In yet another embodiment, an attendee may wish to obtain product information from a particular exhibitor without having to actually visit the exhibitor's booth. Preferably, the exhibition comprises one or a plurality of kiosks 160 or a download location at which the attendee may engage his portable device with the administrator system or an exhibitor network, navigate via a computer to the desired exhibitor content, and trigger upload of such content, as well as download of demographic information. In another embodiment, a download kiosk, as discussed immediately above, can be combined with such an exhibitor information download location. In still another embodiment, instead of uploading exhibitor information to the attendee's portable device, such exhibitor information may, if desired, be burned directly to a CD, DVD, or the like.

With continued reference to FIG. 7, the attendee environment 80 preferably includes a computer 82 that the attendee can control. After the attendee has completed the exhibition and returns to his hotel room, home, office or the like at which he has access to a computer 82, the attendee can access the information on his portable device 20 via his own computer 82 by engaging the portable memory device 20 with a computer interface support such as a USB port. In one embodiment, the attendee device is adapted to work with currently-available commercial operating systems such as Microsoft® Windows®, in order to navigate the file structure of the device 20. In another embodiment, during portable device initialization the administrator uploads a reader and/or direction that presents a file structure for the exhibitor information and, for example, provides HTML-based links adapted to direct a user to uploaded information of a particular exhibitor.

Preferably, the attendee may simply copy all of the uploaded exhibitor product information from the portable device 20 to the attendee's computer 82 for storage and access. Additionally, any file organization or linking structure uploaded on to the portable device 20 may also be copied to the attendee's computer 82 to ease management of the exhibition information. Preferably, each exhibitor folder includes at least one subfolder having uploaded product information files, and another subfolder having demographic information about the exhibitor. The demographic subfolder also includes fields to which the attendee can access and add information. For example, the attendee may wish to memorialize a conversation that he had with one of the exhibitor's sales representatives about a particular product.

In a still further embodiment, exhibitor demographic information preferably is saved and presented in an easily exportable format, such as the CSV format, so that an attendee may, if desired, download such information to a database, spreadsheet, or other contact-tracking device. In still another embodiment, some of the exhibitor information can be in the format of an electronic business card that can easily be imported into commercially-available contact management programs such as Microsoft® Outlook®.

After the exhibition, an exhibitor likely will have a collection of demographic data linked to specific product information files that were uploaded by attendees. As discussed above, preferably the demographic data is stored in a substantially universally-usable format such as the CSV format. Preferably, the exhibitor software downloaded on to the exhibitor computer is adapted to manage such demographic data so that it can be easily exported to a database, spreadsheet, word processor, or other data management program. Additionally, preferably the transfer software is configured to enable creation of certain reports based on the data. For example, if an exhibitor provided more than one type of information file, a report can be created to show how many of each type of information file were uploaded by attendees.

It is anticipated that exhibitors will wish to provide more information to attendees than is possible within the electronic file size constraints allotted to the exhibitor. Accordingly, exhibitors can take strategies for maximizing the effectiveness of the electronic content volume they are authorized to upload. For example, in one embodiment the content comprises at least one HTML web page having active links to the exhibitor's website. Preferably, the linked web page has content specifically tailored to the product information requested by the attendee. For example, a dedicated web page that may or may not be accessible through regular navigation of the exhibitor's website may be linked to content uploaded by the attendee during an exhibition. As such, the size of information actually uploaded to the attendee's device can be quite small, but when the link to the exhibitor's dedicated web page is actuated, the amount of information that the attendee can access can be substantially unlimited.

Additionally, it is to be understood that the content uploaded by the exhibitor is not limited to any particular form. For example, such content may include readable PDF-type electronic versions of catalogs, sales guides, and other traditional product literature. In additional embodiments, media-based content such as full-motion video and/or audio productions, PowerPoint presentations, executable software, and data files in other formats are contemplated.

Figure 11:
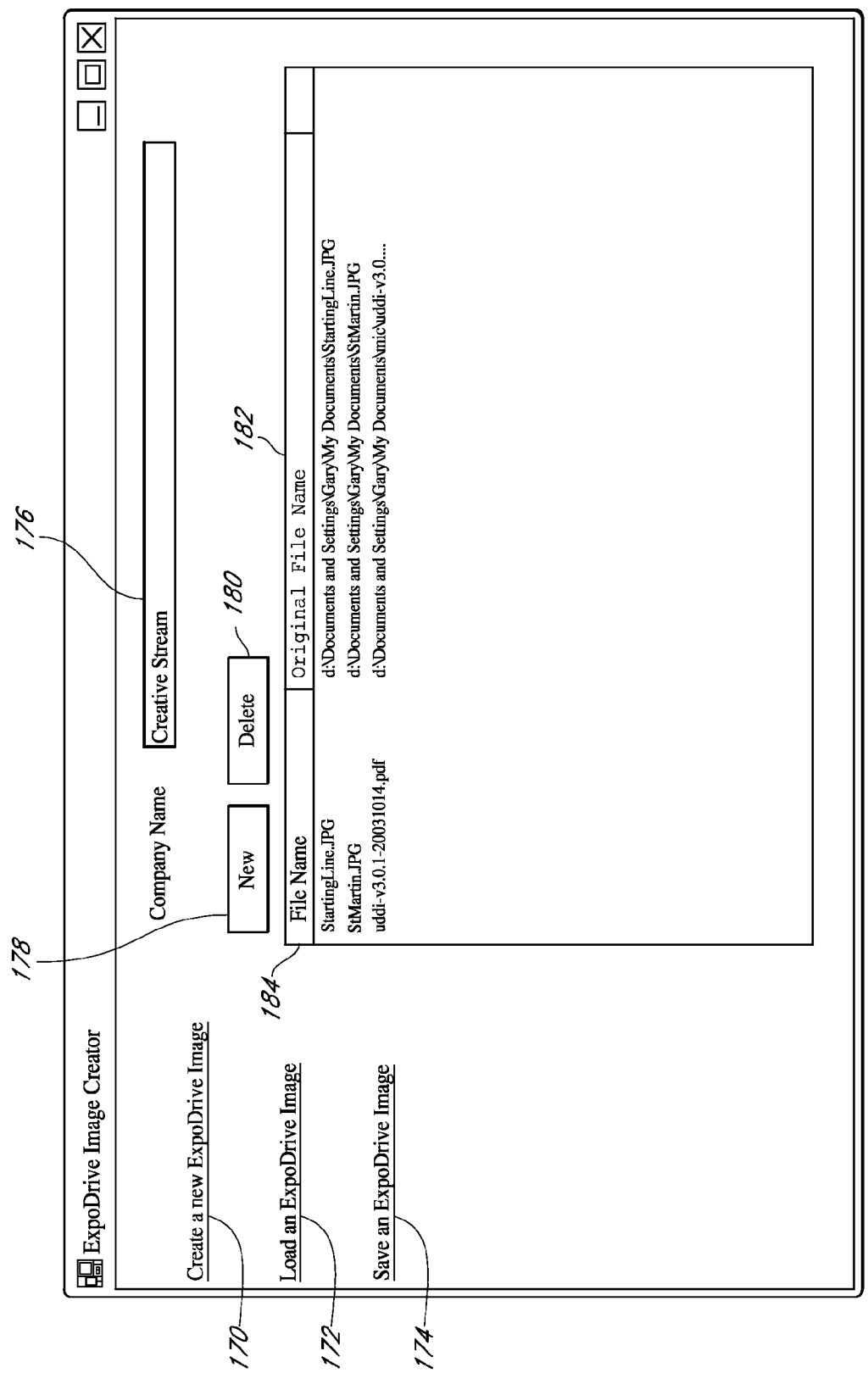
FIG. 11 is a screen shot of an administrator computer during an exhibitor set-up phase in accordance with an embodiment.
Figure 12:
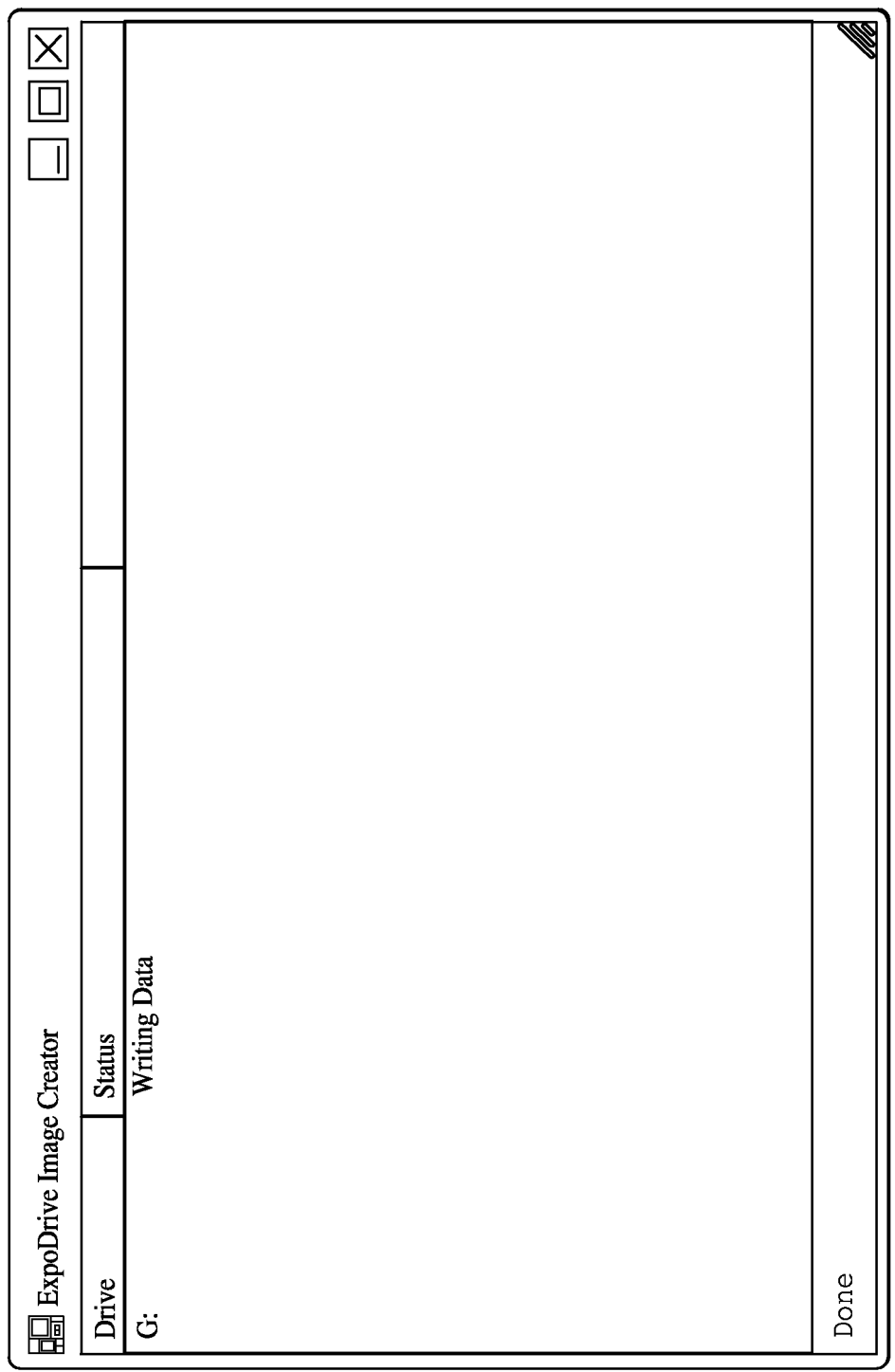
FIG. 12 is a screen shot of an exhibitor computer while writing data to an engaged portable memory device in accordance with an embodiment.
Figure 13:
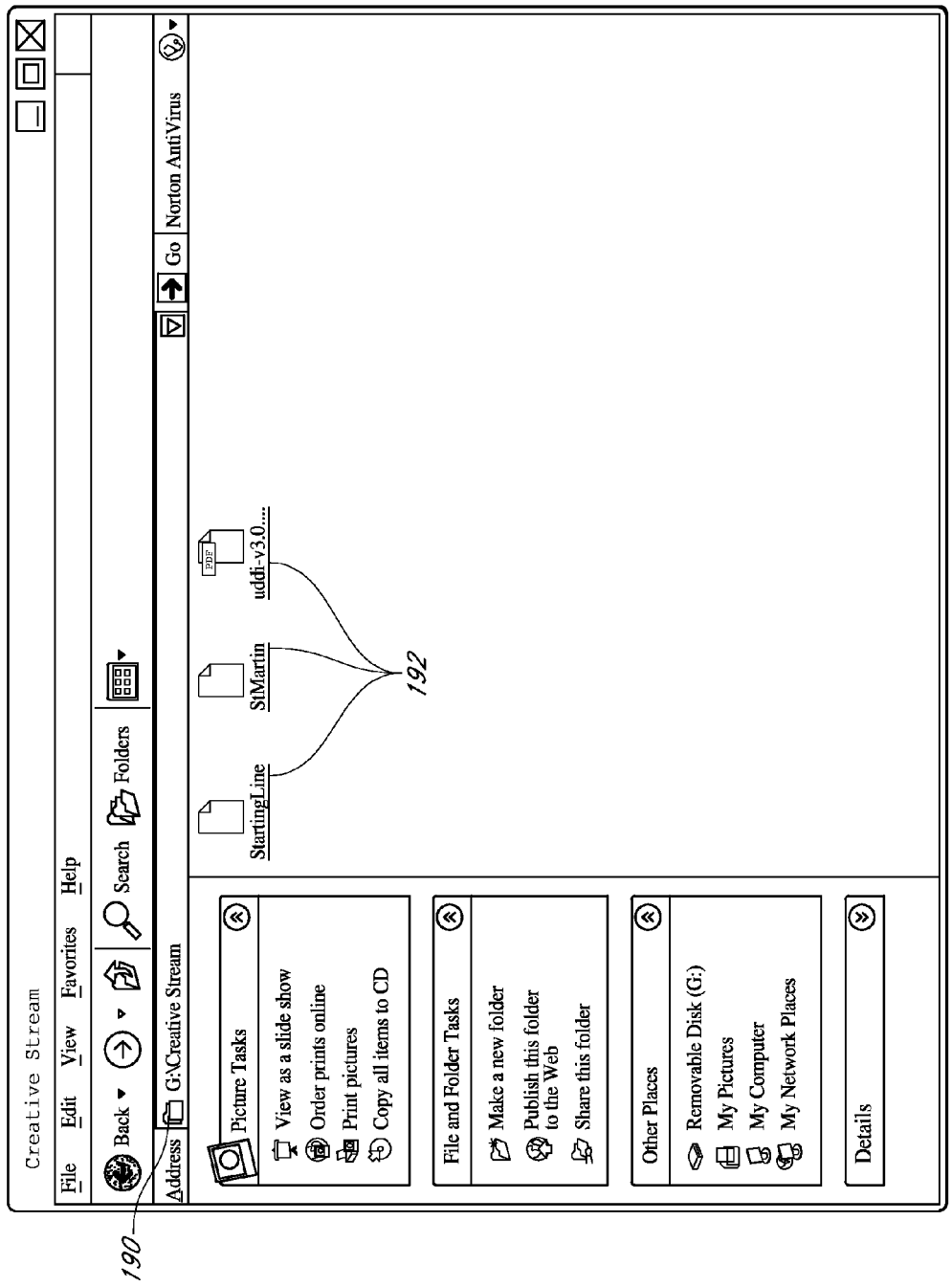
FIG. 13 is a screen shot of an attendee computer displaying contents of an engaged portable memory device that has uploaded exhibitor data in accordance with an embodiment.

FIGS. 11-13 present screen shots of certain phases of software in accordance with a sample embodiment incorporating aspects discussed herein. FIG. 11 is a screen shot of one embodiment of the administrator system during the routine of setting up customized exhibitor software. In the illustrated screen, a link 170 is provided to creating a new exhibitor software package. This entails creating and/or importing exhibitor profile information as well as exhibitor electronic content intended for upload to attendee devices. There is also a link 172 to load an existing customized software set up in order to edit or otherwise change such a set up. Further, there is a link 174 for saving the customized software setup for installation to an exhibitor computer.

In the screen shot illustrated in FIG. 11, much of the exhibitor's information has been entered and analyzed. For example, there is a field 176 in which the exhibitor's company name is displayed, and a button 178 is provided for adding authorized files for the exhibitor to upload during the exhibition. A button 180 is also provided for deleting files in the event of a change in decision or file content by the exhibitor. When files are added, the exhibitor identifies the original file name and location 182 of the file on the exhibitor's computer 78. As discussed above in connection with FIG. 9, the administrator system 72 assigns a file name 184 to each exhibitor data file. In the illustrated embodiment, the file names 184 are substantially the same as the file names 182 originally submitted by the exhibitor.

With reference next to FIG. 12, a screen shot from an exhibitor computer 78 during interface with an attendee's portable memory device 20 is shown. In this embodiment, the exhibitor computer screen is an indicator that communicates the status of data transfer. Of course, in other embodiments, different types of indicators may be used. In a still further embodiment, one exhibitor computer 78 can be adapted to communicate with multiple ports 50 at the same time, and the computer screen may simultaneously indicate the status of each of the ports.

In one embodiment, the transfer software shuts down other operations of or access to the computer 78 when the transfer software is running. For example, the computer keyboard may be disabled unless a code (i.e., ctrl-alt-"x") is entered. In another embodiment, the exhibitor computer 78 may be operated for unrelated uses, and the data transfer proceeds in the background.

With reference next to FIG. 13, once an attendee has uploaded all desired vendor information, the attendee can engage the portable device 20 with the attendee's own computer 82. FIG. 13 is a screen shot illustrating a view of the attendee's own computer 82 screen when navigating the attendee's engaged portable device 20 with Microsoft® Windows® Explorer® software, which is readily commercially available. In the illustrated embodiment, the attendee has navigated into an exhibitor's folder 190, and the screen shows icons 192 of uploaded files that are saved within that folder 190.

Figure 14:
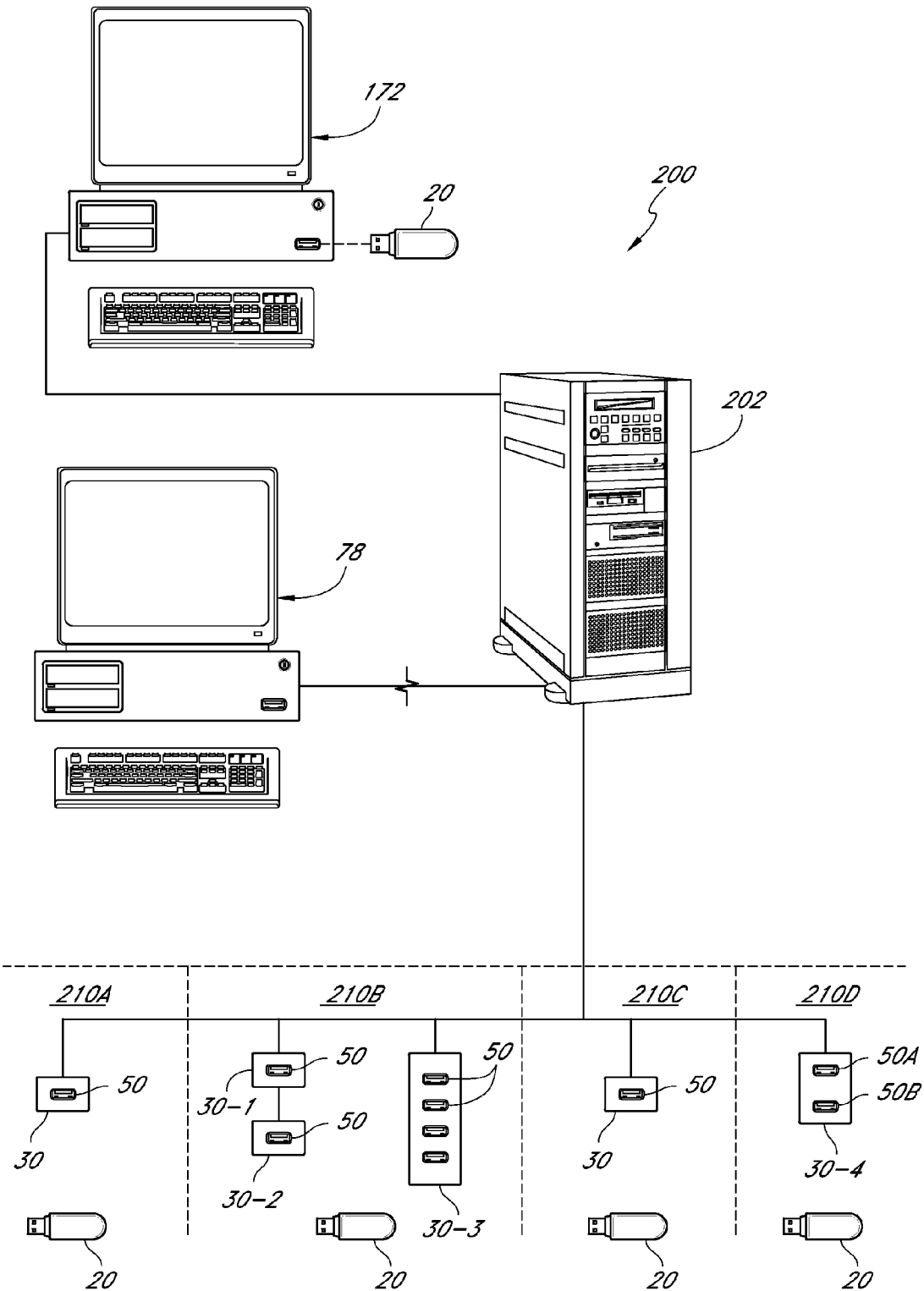
FIG. 14 is a schematic representation of another embodiment of a system and method that incorporates a network server.

With reference next to FIG. 14, a schematic representation of another embodiment is presented in which, rather than each exhibitor having its own dedicated computer 78 running transfer software specifically configured for that exhibitor and separately downloaded onto the exhibitor's computer 78, the exhibition administrator operates a network 202 including a server 202 that is connected to substantially all of the interface devices 30 throughout the exhibition.

The network server 202 preferably communicates with the administrative system 72, which initializes portable electronic memory devices 20. In one an embodiment, rather than downloading attendee demographic data onto the portable memory device 20, the administrator downloads a code corresponding to the attendee. Preferably, exhibitors provide their profile and uploadable content to the network 200. The exhibitor and content preferably are also assigned a code, and codes are appropriately linked to the IP address of a corresponding interface port or ports.

As shown in FIG. 14, preferably, each exhibitor booth 210 A-D has one or more interface units 30 adapted to interface with an attendee's portable memory device 20. In the illustrated embodiment, a first exhibitor 210A and a third 210C exhibitor each have only one interface port 50. A second exhibitor 210B has a plurality of interfaces 30-1, 30-2 that may be configured differently from one another. For example, a first group 212 of interfaces comprises interfaces 30-1, 30-2 that may be located remotely from each other but are linked to upload the same electronic content. A second interface 30-3 harbors multiple interface ports, and is linked to different electronic content than the first group of interfaces. For a fourth exhibitor 210D, one or more interfaces 30-4 has a plurality of ports 50A-d, and each port 50 is dedicated to a different set of electronic content. As such, when an attendee engages his portable device 20 with port 50A, the content corresponding to port 50A will be identified by the network server 202 and uploaded to the portable device 20.

The network 200 preferably records the attendee and exhibitor content codes so as to track which content was uploaded by which attendee. At the completion of the exhibition, the administrative network preferably provides to each exhibitor a report detailing the data transfer activity for each of the exhibitor's content and supplying attendee demographic information corresponding to uploaded content in accordance with the level of demographic information to which the exhibitor is authorized.

In another embodiment, a particular exhibitor having a large tradeshow booth may have its own network, including a server, to monitor several interface devices associated with a plurality of different products. Such a network could connect to the larger administrator network or, in another embodiment, may stand independent of the administrator network.

As with the other embodiments, the attendee will have the uploaded exhibitor information on his portable memory device 20, and can download such information to a computer 82.

In accordance with the embodiment illustrated in FIG. 14, an exhibitor may access or otherwise interact with the network server 202 in order to update the exhibitor profile and/or change the uploadable content the exhibitor wishes to correspond to each assigned port. Preferably, an exhibitor computer 78 can be linked to the server via a network connection 220 in order to accomplish this. Additionally, reports from the network 200 can be delivered electronically via the network, the Internet, or the like to the exhibitor computer 78.

Notably, in one embodiment, all of the computing hardware, such as desktop and laptop computers, networks, interface ports such as USB ports and hubs, and portable memory devices, are off-the-shelf products that are commercially available without special changes. In other embodiments, certain components such as interface devices and kiosks, may be specially constructed.

The embodiments discussed above have been presented in the context of an exhibition such as a trade show. It is to be understood, however, that inventive aspects discussed herein can be applied in many different situations. For example, in a professional conference, an exhibitor may have information about or copies of a paper presented at the conference. The attendee may not provide any demographic information or, in another embodiment, may include demographic information that is equivalent to a business card.

In another embodiment, aspects discussed herein can be used in accordance with an educational event having one or more stations that present certain educational ideas, themes, activities, and/or testing of certain principles. A student having a portable memory device may perform an interactive activity at the particular educational station. The student may then upload information that the student finds interesting and/or may upload a record of the student's performance in the desired activity. In another embodiment, after the student has performed an activity and/or performed a test, the station will determine information for the student to upload based upon the student's performance in the test. In still another embodiment, such information may include additional course work to assist the student in areas that were detected being as weak based upon the student's test performance. In a further embodiment, the student engages his portable device in order to activate the station, which may customize content delivery for the student based upon a profile read from the student's portable memory device.

In yet another embodiment, transfer software can be configured with a plurality of data files, and a user's portable memory device may be authorized to upload only data files approved for the user's authorization class or level. For example, in one embodiment, an educational facility may make class materials such as a syllabus, homework assignment or solutions, special events, etc. available for upload to a student's portable memory device. However, upon engagement of the device with the facility computer, the student is identified, and authorization to view and/or upload is only granted for materials associated with the classes the student is registered for. In one embodiment, a code indicating the authorization is saved on the portable device and is read by the computer upon engagement. In another embodiment, the user's authorization scope is saved with other user information as a user data file on the network, and the portable device includes an identification that points the network to the user's data file.

In still another embodiment, aspects discussed herein can be used as an optional device and/or system for any type of exhibition, exposition, fair, or the like. For example, in a county fair, attendees may obtain a portable memory device which they can use to obtain additional information about exhibitors at the fair.

In accordance with still further embodiments, aspects discussed herein can be used in many sales environments. For example, a retail store or dealership may have product displays that include ports for interacting with portable memory devices. Administration of such ports and devices need not be limited to a particular event. Rather, one or more administrative organizations or cooperatives may administer the use of such devices in conjunction with member users and vendors.

In most of the embodiments discussed above, the system and method have downloaded demographic information about a portable memory device user in exchange for product content from an exhibitor vendor or the like. In another embodiment, a portable memory device may not contain such demographic data and/or the data on the device may not be accessible to a vendor computer with which the device may interface. Instead, engaging the portable device with the vendor computer's interface triggers upload of a specifically-identified electronic file without the portable device necessarily providing any information to the vendor computer. In still another embodiment, the portable device provides non-identifying demographic information to the vendor. As such, the portable device owner benefits by obtaining product information while protecting her identity, and the vendor benefits by obtaining demographic information about a potential customer, even though such information may not specifically identify the potential customer.

In still another embodiment, a system and/or cooperative is set up in which vendors are issued a key code or the like along with data transfer software. Likewise, users are provided with portable memory devices that include software that will not allow download of information from a vendor unless the proper key is detected. As such, a broad ranging cooperative of vendors and consumers can be set up in which consumers desiring certain information from a vendor can interface with a vendor product display without fear that an unscrupulous or unauthorized vendor will upload excessive and/or unapproved data files. Vendors issued a key will be monitored to ensure they comply with system policies concerning file size and content so that use of the cooperative is safe and effective.

In the embodiments illustrated above, interface devices that are hard-wired to associated computers have been shown. However, it is to be understood that engagement between a portable device and a computer can be accomplished via wireless technology as well. For example, wireless technology such as Bluetooth and 802.11b or g may enable data exchange.

In one embodiment, a plurality of Bluetooth-enabled interface devices are sensed by a user's Bluetooth-enabled portable memory device such as, for example, a PDA. The user will be prompted whether to connect, for example, to Product A information, Product B information, Product C information, or the like. Upon the user selecting, for example, Product B, the portable device will pair with the interface corresponding to Product B information, which pairing comprises an engagement that will trigger data exchange. Preferably, the portable device includes an indicator to indicate when data exchange is proceeding.

Although the inventions herein have been disclosed in the context of certain preferred embodiments and examples, it will be understood by those skilled in the art that the present inventions extend beyond the specifically disclosed embodiments to other alternative embodiments and/or uses and obvious modifications and equivalents thereof. In addition, while a number of variations have been shown and described in detail, other modifications, which are within the scope of this invention, will be readily apparent to those of skill in the art based upon this disclosure. It is also contemplated that various combinations or subcombinations of the specific features and aspects of the embodiments may be made and still fall within the scope of invention. Accordingly, it should be understood that various features and aspects of the disclosed embodiments can be combined with or substituted for one another in order to form varying modes of the disclosed inventions. For example, an exhibition having a network-server that serves some interfaces, and dedicated exhibitor computers that serve other interfaces, is contemplated. Thus, it is intended that the scope of the present inventions herein disclosed should not be limited by the particular disclosed embodiments described above, but should be determined only by a fair reading of the claims that follow.

What is claimed is:

1. A system for information exchange between content providers and content receivers at an event, comprising:
a plurality of computers, each having an interface port adapted to selectively communicate with a portable electronic memory storage device, each of the content providers having one of the computers;
a unique designated electronic file saved on each computer;
a plurality of portable electronic memory storage devices adapted to be distributed to content receivers, the portable electronic memory storage devices each comprising an authorization key stored thereon, but each of the portable electronic memory storage devices having no demographic data stored thereon concerning the associated content receiver;
software on each computer adapted to be triggered when one of the portable electronic memory storage devices is engaged with the interface port and, upon triggering, to automatically initiate a data upload routine with the engaged portable electronic memory storage device, the software ignoring data files on the portable electronic memory storage device other than the authorization key;
wherein the data upload routine comprises the computer software identifying and reading the authorization key stored upon the portable electronic memory storage device and determining whether the authorization key is valid; and
wherein the computer software is adapted so that if the authorization key is determined to be valid the computer software automatically uploads the designated file to the portable electronic memory storage device and does not download any information from the portable electronic memory storage device to the computer, but the software is adapted to not proceed with the automatic upload unless and until detecting the authorization key on the portable electronic memory storage device.

2. A system as in claim 1 additionally comprising a second designated electronic file saved on the computer and a second interface port adapted to communicate with the computer when a portable electronic storage device is engaged with the second port, wherein the software is adapted to upload the second file to the portable device when the portable device is connected to the second port.

3. A system as in claim 2, wherein the computer comprises a computing network adapted to monitor a plurality of interface ports, and upload electronic files designated for respective ports.

4. The system of claim 1, wherein the computer software is configured to read the portable electronic memory device without any processing activity by the portable electronic memory device.

5. The system of claim 4, wherein the portable electronic memory device does not have its own computer processing functionality.

6. The system of claim 5, wherein the portable electronic memory device does not have its own power source.

7. The system of claim 1 additionally comprising an administrator computer system configured to receive a proposed electronic file from a content provider, evaluate whether the proposed electronic file satisfies a format criteria, add a file authorization key to convert the proposed electronic file into a designated electronic file, and save the designated electronic file to one of the computers.

8. The system of claim 7, wherein the computer software is configured to read the designated electronic file saved on the computer during the data upload routine, and to proceed with the data upload routine only if it determines that the designated electronic file includes a valid file authorization key.

9. The system of claim 8, wherein each content provider has possession of its respective computer with the designated electronic file stored thereon during the event.

10. A method of electronically delivering specialized content from a content provider to content receivers, comprising:
   software of a computer processor associated with a content provider electronically monitoring an interface port adapted to communicate with the computer when a portable electronic storage device associated with one of a plurality of content receivers is engaged with the port;
   the software identifying a designated electronic file saved on the computer;
   the software actuating a trigger upon determining that a portable electronic storage device is engaged with the port; and
   initiating a data exchange routine when the trigger is actuated;
   wherein the data exchange routine comprises;
      the computer software reading the portable electronic storage device to determine whether the portable electronic storage device includes a valid authorization key, the software ignoring data files on the portable electronic storage device other than the authorization key; and
      if the software determines that the portable electronic storage device includes a valid authorization key uploading the designated electronic file to the portable electronic storage device without downloading any data from the portable electronic storage device to the computer, but not proceeding with an automatic upload unless and until detecting the valid authorization key.

11. The method of claim 10 additionally comprising the software reading the designated electronic file on the computer to determine whether the designated electronic file includes a file authorization key, and only uploading the designated electronic file to the portable electronic storage device if the software determines that the designated electronic file includes the file authorization key.

12. The method of claim 10, wherein the software is executed by the computer processor.

13. The method of claim 12, wherein the portable electronic storage device does not perform any computer processing function in accordance with this method.

14. The method of claim 10 additionally comprising an administrator computer system receiving a proposed electronic file, evaluating whether the proposed electronic file satisfies a format criteria, adding a file authorization key to convert the proposed electronic file into a designated electronic file, and saving the designated electronic file to the computer.

* * * * *